(12) United States Patent
Schwagerl et al.

(10) Patent No.: US 8,807,889 B2
(45) Date of Patent: Aug. 19, 2014

(54) ROTARY CUTTING TOOL HAVING SEALED MARGINS AND METHOD OF MAKING SAME

(75) Inventors: Jurgen Schwagerl, Vohenstrauss (DE); Steve George, Greensboro, NC (US); Herbert Rudolf Kauper, Erlangen (DE)

(73) Assignee: Kennametal Inc., Latrobe, PA (US)

( * ) Notice: Subject to any disclaimer, the term of this patent is extended or adjusted under 35 U.S.C. 154(b) by 1201 days.

(21) Appl. No.: 12/648,879

(22) Filed: Dec. 29, 2009

(65) Prior Publication Data

US 2011/0158757 A1    Jun. 30, 2011

(51) Int. Cl.
B23B 51/02    (2006.01)
(52) U.S. Cl.
CPC ........... *B23B 51/02* (2013.01); *B23B 2251/443* (2013.01)
USPC ........................................ 408/230
(58) Field of Classification Search
USPC ......................................... 408/230, 227, 229
See application file for complete search history.

(56) References Cited

U.S. PATENT DOCUMENTS

| | | | |
|---|---|---|---|
| 1,304,981 | A | 5/1919 | Hoagland |
| 2,348,874 | A | 5/1944 | Andreasson |
| 2,912,887 | A | 11/1959 | Andreasson |
| 3,597,103 | A | 8/1971 | Birk |
| 3,598,500 | A | 8/1971 | Oxford, Jr. |
| 4,744,705 | A | 5/1988 | Imanaga |
| 5,567,093 | A | 10/1996 | Richmond |
| 6,132,149 | A * | 10/2000 | Howarth et al. ............... 408/230 |
| 6,419,561 | B1 * | 7/2002 | George ............................ 451/48 |
| 6,602,029 | B1 * | 8/2003 | George ............................ 408/230 |
| 6,648,561 | B2 | 11/2003 | Kraemer |
| 6,929,434 | B2 | 8/2005 | Prokop |
| 7,306,411 | B2 | 12/2007 | Mabuchi et al. |

(Continued)

FOREIGN PATENT DOCUMENTS

| | | |
|---|---|---|
| CN | 1894063 A | 1/2007 |
| DE | 202008006036 U1 * | 7/2008 |

(Continued)

OTHER PUBLICATIONS

Korean Intellectual Property Office, "Notification of Transmittal of the International Search Report and the Written Opinion of the International Searching Authority, or the Declaration", Jul. 25, 2011, 9 pp.

(Continued)

*Primary Examiner* — Eric A Gates
*Assistant Examiner* — Paul M Janeski
(74) *Attorney, Agent, or Firm* — Larry R. Meenan, Esq.

(57) ABSTRACT

A rotary cutting tool includes a generally cylindrical body having a first end, a second end and a longitudinal axis therebetween. A mounting portion is disposed about the first end, a head portion having an outer diameter is disposed about the second end, and a body relief portion having an outer diameter less than the head portion is disposed therebetween. The head portion is structured to engage and cut a workpiece. A number of flutes extend from the second end of the cylindrical body along the head portion and along at least a portion of the body relief portion. The head portion includes a number of margin relief surfaces, each disposed between adjacent flutes and inset a distance from the outer diameter of the head portion and extending from the second end of the cylindrical body and terminating at a margin seal within the head portion.

18 Claims, 5 Drawing Sheets

(56) References Cited

U.S. PATENT DOCUMENTS

| | | | |
|---|---|---|---|
| 7,740,426 B2 | 6/2010 | Yamamoto | |
| 7,909,549 B2 * | 3/2011 | Kondoh et al. | 409/132 |
| 2006/0275092 A1 | 12/2006 | Yamamoto | |
| 2007/0081870 A1 * | 4/2007 | Muhlfriedel et al. | 408/230 |
| 2008/0199268 A1 * | 8/2008 | Krenzer et al. | 408/230 |
| 2010/0092259 A1 * | 4/2010 | Borschert et al. | 408/230 |
| 2010/0158626 A1 * | 6/2010 | Nakahata et al. | 408/230 |

FOREIGN PATENT DOCUMENTS

| | | | |
|---|---|---|---|
| DE | 102008049508 A1 * | 3/2010 | |
| EP | 0 419 428 B1 | 5/1993 | |
| JP | 401051218 A | 2/1989 | |
| JP | 405220611 A | 8/1993 | |
| JP | 2004-195561 A | 7/2004 | |
| JP | 2004195561 A * | 7/2004 | |
| JP | 2005177891 A * | 7/2005 | |
| JP | 02007136563 A | 6/2007 | |
| KR | 10-2004-0020853 A | 3/2004 | |
| KR | 10-0853978 A | 8/2008 | |
| WO | WO 2007083967 A1 * | 7/2007 | |

OTHER PUBLICATIONS

Nov. 5, 2013—OA.

* cited by examiner

ROTARY CUTTING TOOL HAVING SEALED MARGINS AND METHOD OF MAKING SAME

BACKGROUND

1. Field of the Invention

The invention relates generally to rotary cutting tools and, more particularly, to rotary cutting tools having at least one helical flute and land having at least two margins on the land. Additionally, the invention relates to methods of producing such cutting tools.

2. Background Information

Figure 1:
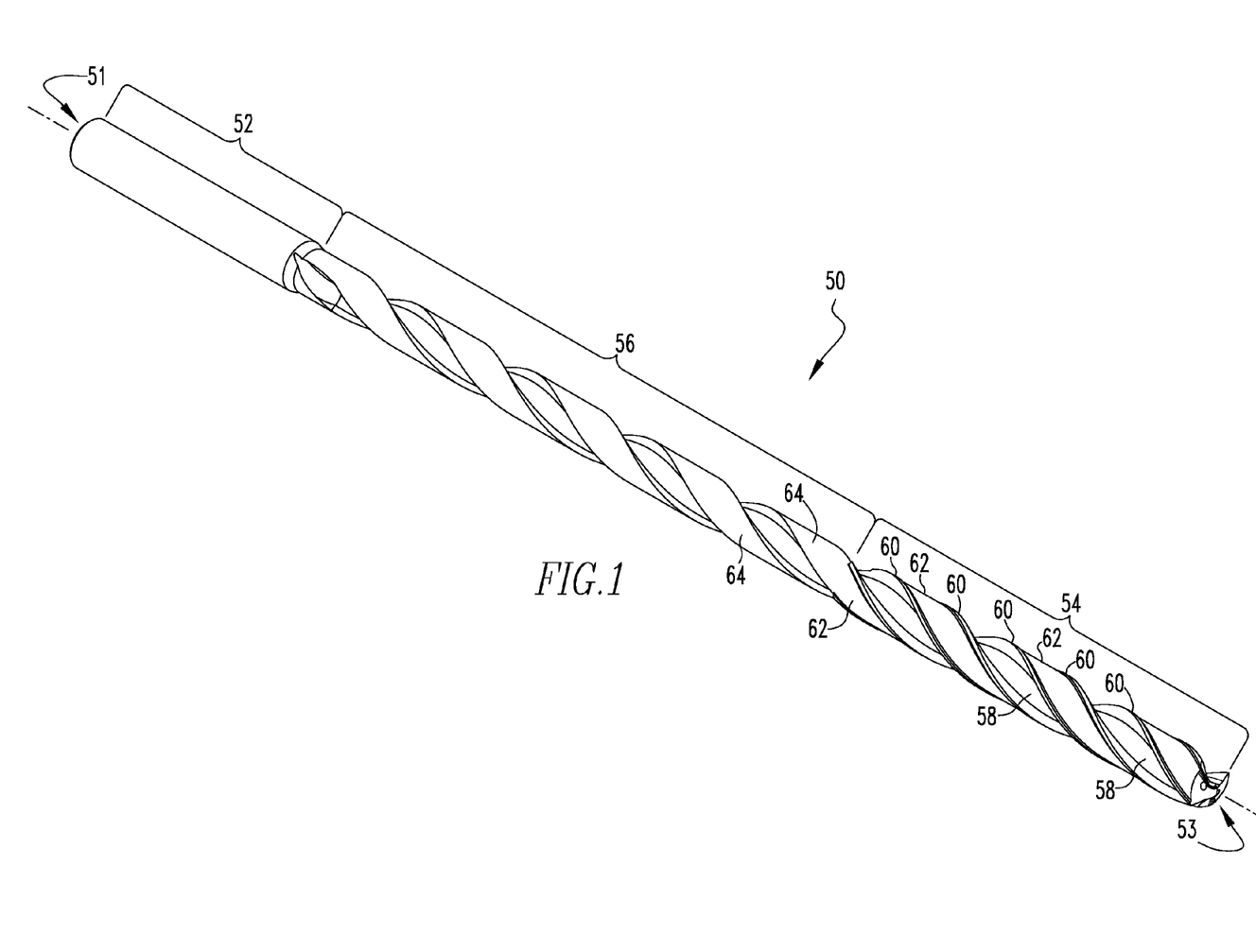
FIG. 1 is an isometric view of a known rotary cutting tool.

Double margin drills, such as the deep hole twist drill 50 shown in FIG. 1, are known. Such drills are of generally cylindrical shape and include a mounting portion 52 located at or near a first end 51 of drill 50 for mounting the drill 50 in a chuck mechanism (not shown) of a machine, an opposite head portion 54 located at or near an opposite second end 53 of drill 50 for engaging and cutting a workpiece (not shown), and a body relief portion 56 disposed between the mounting portion 52 and the head portion 54. Body relief portion 56 has a diameter less than the head portion 54 in order to reduce potential unnecessary contact with the edges of a hole being cut as body relief portion is not meant to perform material cutting but instead to assist in the transfer of cutting debris from head portion 54 toward mounting portion 52.

Continuing to refer to FIG. 1, deep hole twist drill 50 further includes a number of helical flutes 58, each extending from the second end 53 of the drill 50 along the head portion 54 and all, or part of, body relief portion 56. Flutes 58 provide for the discharge of cutting chips (formed from cutting operations on a workpiece) from second end 53 generally toward mounting portion 52, outward from the leading end of a hole being formed. Each flute 58 of head portion 54 is bounded by a pair of margin lands 60. Extending between the margin lands 60 of adjacent flutes 58 is margin relief surface 62 which is generally recessed inward from each of the margin lands 60. As shown in FIG. 1, such margin relief surfaces 62 extend from the second end 53 of drill 50 along all of head portion 54 and generally end at body relief portion 56. Typically, the outer diameter (not numbered) of the drill 50 in the body relief portion 56 is equal to or less than the diameter (not numbered) of the drill 50 at each of the recessed margin relief surfaces 62 such that each of the margin relief surfaces generally evenly transition into or taper down into the outer surface 64 of the body relief portion.

Such double margin drills provide for a number of advantages over other rotary cutting. However, there still exists room for improvement.

SUMMARY OF THE INVENTION

These needs and others are met by embodiments of the invention, which are directed to a rotary cutting tool and a method of making a rotary cutting tool.

As one aspect of the invention, a rotary cutting tool is provided. The rotary cutting tool including a generally cylindrical body having a first end, an opposite second end and a longitudinal axis extending therebetween. A mounting portion is disposed at or near the first end and head portion having an outer diameter is disposed at or near the second end, the head portion being structured to engage and cut a workpiece. A body relief portion is disposed between the mounting portion and the head portion, the body relief portion having an outer diameter less than the outer diameter of the head portion. A number of flutes extend from the second end of the generally cylindrical body along the head portion and along at least a portion of the body relief portion, each of the number of flutes are generally bounded by a first edge and a second edge. The head portion includes a number of margin relief surfaces, each of the number of margin relief surfaces is disposed between an adjacent first edge and second edge of the number of flutes and inset a distance from the outer diameter of the head portion. Each of the number of margin relief surfaces extends from the second end of the generally cylindrical body and terminates at a margin seal within the head portion.

The number of flutes may follow a generally helical path defined by a helix angle relative to the longitudinal axis. The number of flutes may be oriented generally parallel to the longitudinal axis.

Each margin seal may include a wall portion extending between a corresponding one of the number of margin relief surfaces and the outer diameter of the head portion. The wall portion may be oriented generally perpendicular to the longitudinal axis of the cylindrical body. The wall portion may be oriented generally perpendicular to the corresponding one of the margin relief surfaces. The wall portion may be oriented at an angle relative to the corresponding one of the margin relief surfaces. The wall portion may be oriented at an angle relative to the longitudinal axis of the generally cylindrical body.

The generally cylindrical body may have a length with the ratio of the length to the outer diameter of the head portion being at least 7 to 1.

As another aspect of the invention, a method of making a rotary cutting tool is provided. The rotary cutting tool including a generally cylindrical body having a first end and an opposite second end, a mounting portion disposed at or near the first end, and a body relief portion disposed between the mounting portion and the head portion. The head portion being disposed at or near the second end and being structured to engage and cut a workpiece. The body relief portion having an outer diameter less than the outer diameter of the head portion. The method including forming a number of flutes in the generally cylindrical body; the number of flutes extending from the second end of the generally cylindrical body along the head portion and along at least a portion of the body relief portion. Each of the number of flutes being generally bounded by a first edge and a second edge. The method further including forming a number of margin relief surfaces, each margin relief surface being disposed adjacent a first edge and a second edge of the number of flutes and extending from the second end of the cylindrical body and ending at a margin seal within the head portion.

Forming the number of margin relief surfaces and at least a portion of the number of flutes may occur simultaneously. The number of flutes may be formed following a generally helical path defined by a helix angle relative to the longitudinal axis of the generally cylindrical body. The number of flutes may be formed in an orientation generally parallel to the longitudinal axis of the generally cylindrical body. Forming at least one of the number of flutes and the number of margin relief surfaces may occur by a grinding operation. Forming at least one of the number of flutes and the number of margin relief surfaces may occur by a molding operation.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

As used herein, the term "number" shall be used to refer to any non-zero quantity (i.e. one or any quantity greater than one).

FIGS. 2-6 depict an example rotary cutting tool 10 of generally cylindrical shape, in accordance with a non-limiting embodiment of the invention, having a first end 12, an opposite second end 14 and a central longitudinal axis 16, for conducting rotary cutting operations on a work piece (not shown) when cutting tool 10 is rotated about central longitudinal axis 16. Although cutting tool 10 is shown in the form of a deep hole drill, it is to be appreciated that the concepts described herein may also be applied to other rotary cutting tools such as, for example, reaming tools, without varying from the scope of the invention.

Figure 3:
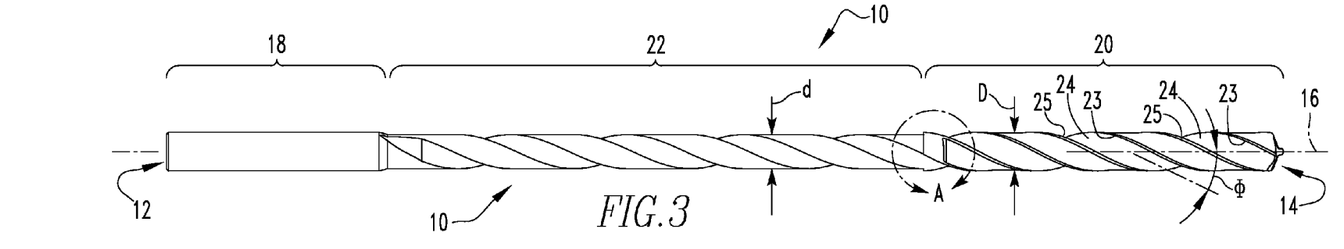
FIG. 3 is a side elevation view of the rotary cutting tool of FIG. 2.

Referring to FIG. 3, cutting tool 10 includes a mounting portion 18 disposed at or near first end 12 for mounting the cutting tool 10 in a chuck mechanism (not shown) of a machine, a head portion 20 disposed at or near second end 14 for engaging and cutting a workpiece (not shown), and a body relief portion 22 disposed between the mounting portion 18 and head portion 20. As shown in FIG. 3, head portion 20 has an outer diameter D which is greater than the outer diameter d of body relief portion 22 which helps to reduce drag along body relief portion 22 when a hole deeper than head portion 20 is being drilled.

Figure 2:
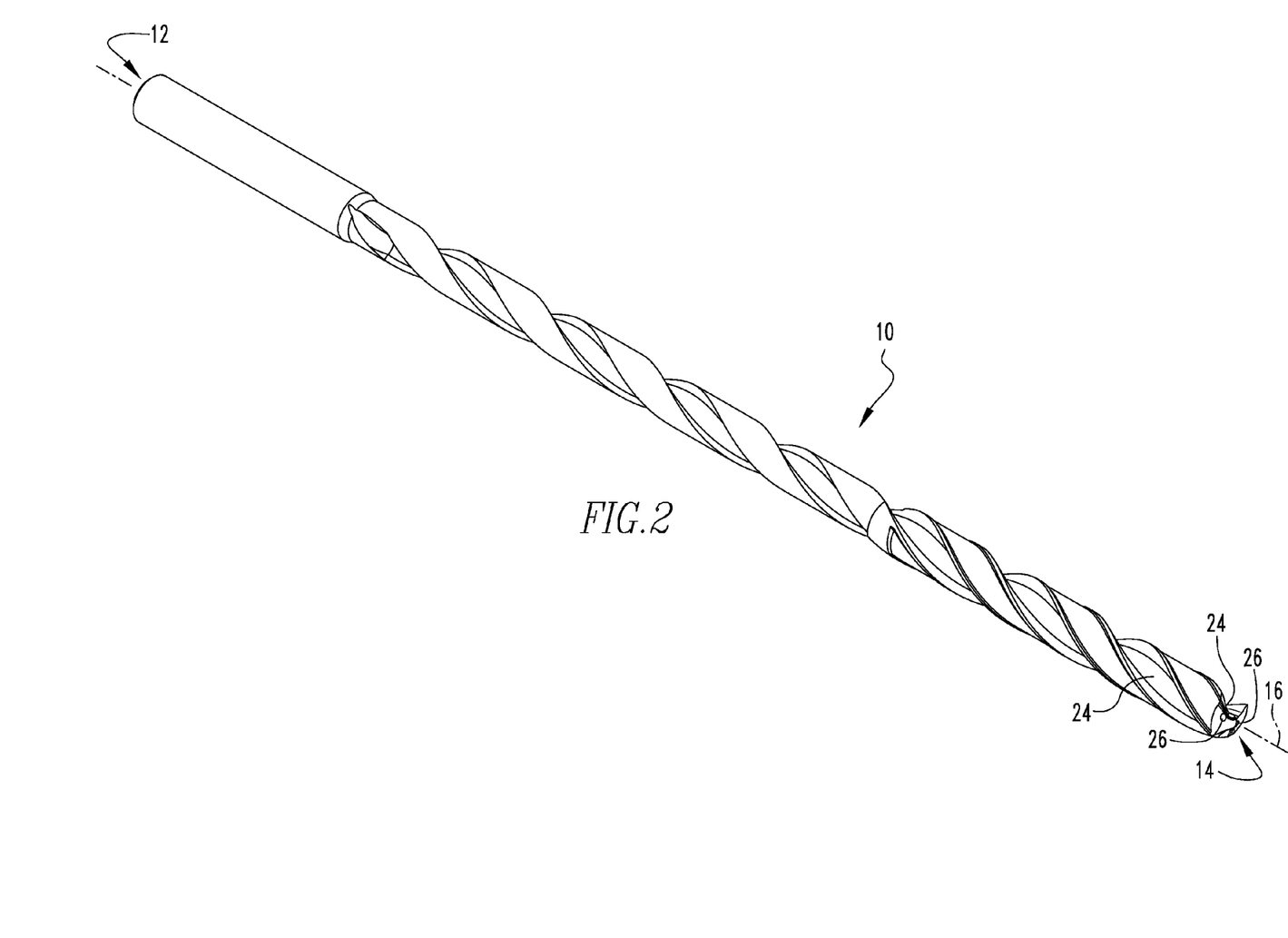
FIG. 2 is an isometric view of a rotary cutting tool in accordance with an embodiment of the invention.
Figure 4:
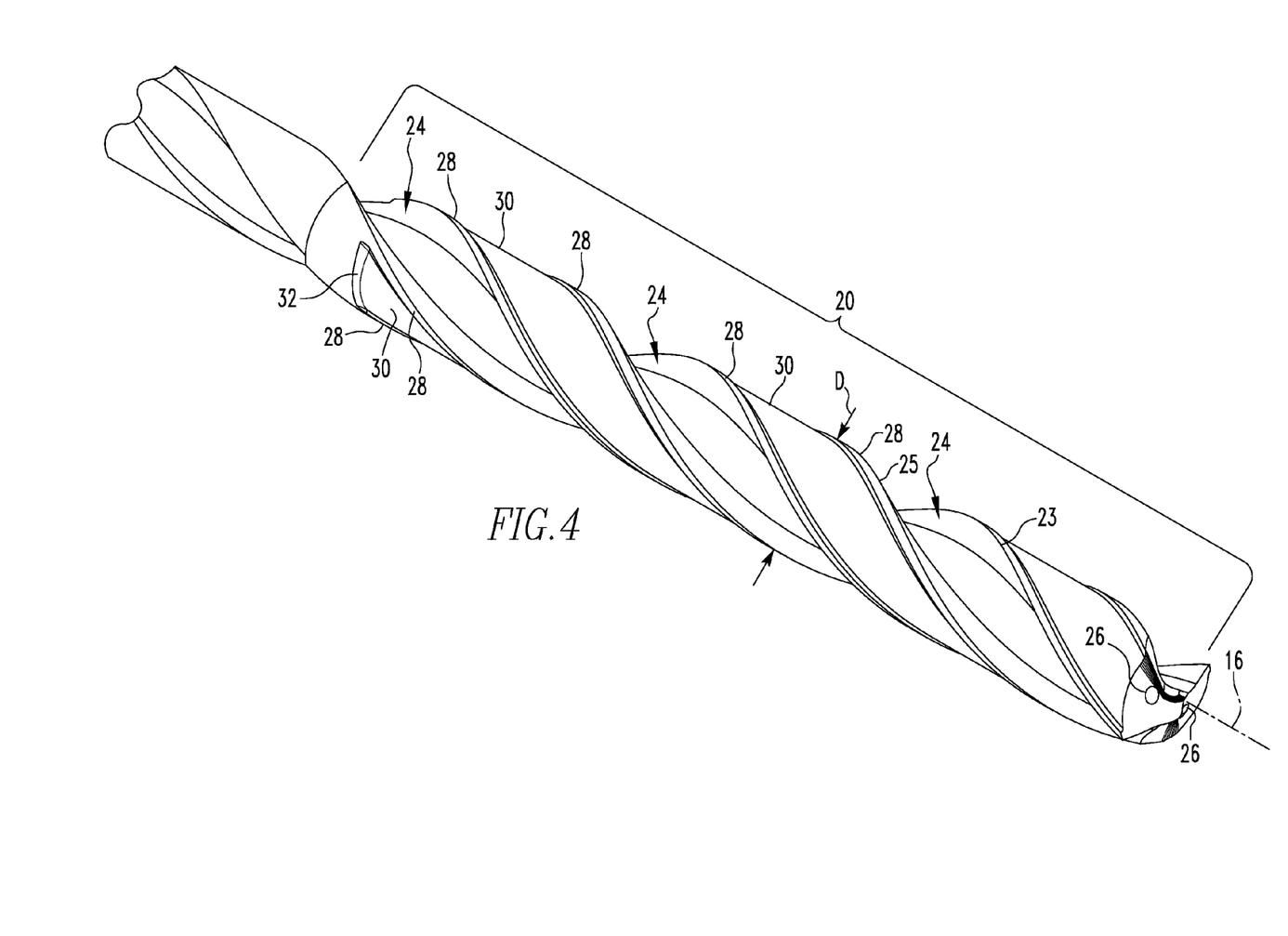
FIG. 4 is an isometric view of a portion of the rotary cutting tool of FIG. 2.
Figure 5:
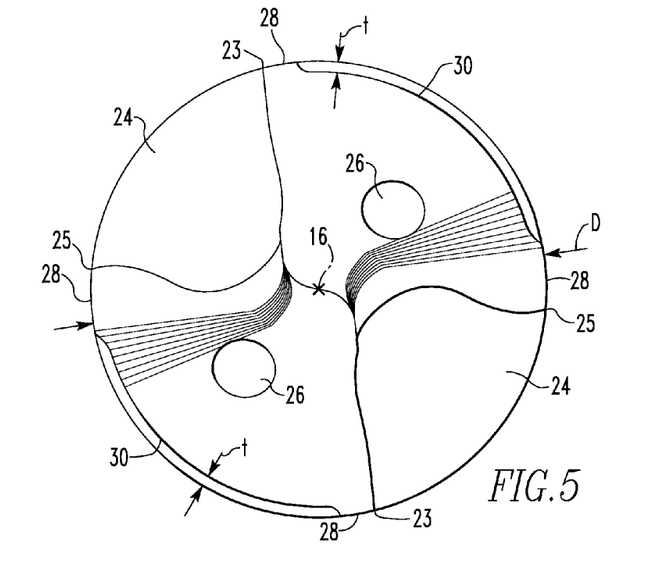
FIG. 5 is an end elevation view of the second end of the rotary cutting tool of FIG. 2.

Continuing to refer to FIG. 3, cutting tool 10 further includes a number of flutes 24, each being generally bounded by a first edge 23 and a second edge 25 and extending from the second end 14 of the cutting tool 10 along the head portion 20 and all, or part of, body relief portion 22. In the example shown, flutes 24 follow a generally helical path defined by a helix angle φ relative to the longitudinal axis 16. As commonly known in the art, flutes 24 provide for the discharge of cutting chips (formed from cutting operations on a workpiece) from second end 14 generally toward mounting portion 18, outward from the leading end of a hole being formed. In the example shown in the Figs., such discharge of cutting chips is aided by a pressurized flow of coolant (not shown) provided to the second end 14 through a number of coolant passages 26 (FIGS. 2, 4 and 5). As commonly known, in addition to aiding in the discharge of cutting chips, such coolant assists in the cutting operation by keeping the cutting tool from overheating and proving lubrication.

Although the example cutting tool 10 shown in the figures includes two flutes 24, it is to be appreciated that the present invention is also readily applicable to cutting tools having only a single flute as well as cutting tools having more than two flutes. Furthermore, although the example flutes 24 are of generally helical shape, it is to be appreciated that other flute profiles (e.g., without limitation, generally straight flutes oriented parallel to central axis 16) may also be employed without varying from the scope of the present invention.

Figure 6:
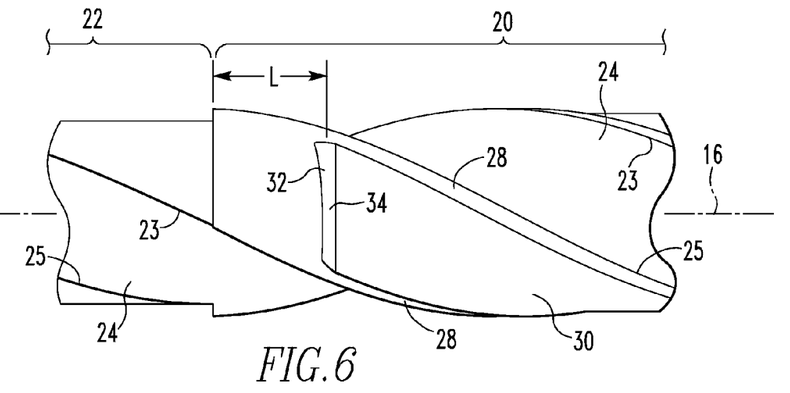
FIG. 6 is a detailed side elevation view of a portion of the rotary cutting tool as indicated at A in FIG. 3.

As shown in greater detail in FIGS. 4 and 5, head portion 20 of cutting tool 10 is somewhat similar to a double margin drill as known in the art, but with a few notable differences as will be discussed further below. Accordingly, each flute 24 of head portion 20 is bounded on each side by a margin land 28 adjacent each of first and second edges 23,25. Extending between the margin lands 28 of adjacent flutes 24 is a margin relief surface 30 which, as known in the art, is generally recessed inward a distance t (see FIG. 5) toward the central axis 16 from each of the margin lands 28. Unlike known margin relief surfaces that extend generally from a cutting tip to the body relief portion of the cutting tool 10, each of the margin relief surfaces 30 of the present invention extends generally rearward along head portion 20 from second end 14 but then terminate at a margin seal 32 within head portion 20, spaced generally a distance L from body relief portion 22 into head portion 20 as shown in FIG. 6. Thus, unlike known double margin drill designs, each of margin relief surfaces 30 do not extend to relief portion 22. In preferred embodiments of the invention, the distance L is generally in the range of about one half the diameter of the head portion 20 (L=½ D) to about twice the diameter of the head portion 20 (L=2 D). It is however to be appreciated that other distances L outside such range may be employed within the scope of the present invention.

Figure 7:
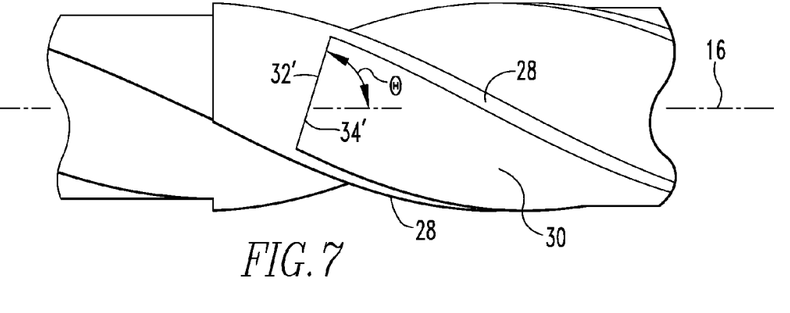
FIG. 7 is a detailed side elevation view showing an alternate embodiment of the portion shown in FIG. 6.

As shown in FIG. 6, margin seal 32 may be oriented generally perpendicular to central axis 16. Such margin seal 32 may commonly be created during machining operations forming the cutting tool 10 by stopping the grinding process or processes, which generally form margins 28 and margin relief surface 30 (typically carried out after formation of flutes 24), the distance L prior to reaching body relief portion 22, where such operations began at second end 14. Alternatively, such margin seal 32 may be created by starting the grinding process the distance L in from body relief portion 22 and continuing toward second end 14. In either situation, the rotational axis of the grinding wheel (not shown) would be oriented generally parallel to central axis 16 of cutting tool 10, thus producing margin seal 32 oriented generally transverse to central axis 16. Such generally transverse margin seal may be formed having a generally angled surface 34 relative to the adjacent margin relief surface 30, such as shown in the example margin seal 32 of FIG. 6, or alternately, may have a surface 34' oriented generally perpendicular to the adjacent margin relief surface 30, such as shown in the example margin seal 32' of FIG. 7, discussed further below. In either case, the angle of the surface of margin seal 32 may be varied by varying the cutting profile of the edge of the grinding wheel used to form margin relief surface 30.

As an alternative to the orientation shown in FIG. 5, the margin seal may also be oriented at an angle θ relative to central axis 16, as shown by margin seal 32' of FIG. 6. Such angle θ may be achieved by orienting the rotational axis of grinding wheel(s) (not shown) perpendicular to such angle θ or generally parallel to the helix angle φ previously discussed (which could be used to produce either an angled or perpendicular surface for the margin seal depending on the profile of the grinding wheel, as previously described) or by orienting the rotational axis of the grinding wheel(s) at the angle θ (which would produce an angled margin seal surface).

During hole cutting operations in which the pressurized flow of coolant is provided through each of coolant passages 26 to second end 14 of cutting tool 10, the presence of margin seal 32 causes pressurized coolant to back into pockets (not numbered) defined by margins 28, margin relief surface 30, and the walls of the hole being cut once the depth of the hole being drilled has reached margin seal 32 (i.e., approximately the entire head portion 20 less the distance L is within the hole being cut). In embodiments of the invention in which the cutting tool 10 is provided with a slight backtaper, the diameter of head portion 20 at or about margin seal 32 is preferably equal to the diameter of head portion 20 near the second end 14 of cutting tool 10 (generally the max diameter of the cutting tool 10) to help ensure the buildup of pressurized coolant in the pockets previously described.

The backup of pressurized coolant provides a number of benefits to cutting operations beyond those seen in known designs. For example, the pressurized coolant tends to act as a hydrodynamic bearing providing increased stability to the drill 10. Additionally, improved cooling of each of the margins lands 28 is provided by the coolant forced against each of the margin lands 28. Such improved cooling helps to extend wear life of the cutting tool 10. Accordingly, the present invention, while applicable to other applications, is particularly desirable for use in deep hole cutting operations where the ratio of hole depth to hole diameter may generally range, for example, from about 7:1 to beyond 30:1. Such benefit is not provided in known designs in which any coolant present along the margin relief surfaces may freely pass along the margin relief surface and out of the hole being cut, regardless of hole depth.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A rotary cutting tool comprising:
    a generally cylindrical body having a first end, an opposite second end and a longitudinal axis extending therebetween;
    a mounting portion disposed at or near the first end;
    a head portion having an outer diameter disposed at or near the second end, the head portion being structured to engage and cut a workpiece;
    a body relief portion disposed between the mounting portion and the head portion, the body relief portion having an outer diameter less than the outer diameter of the head portion; and
    a number of flutes extending from the second end of the generally cylindrical body along the head portion and along at least a portion of the body relief portion, each of the number of flutes being generally bounded by a first edge and a second edge,
    wherein the head portion comprises a number of margin relief surfaces, wherein each of the number of margin relief surfaces is disposed between an adjacent first edge and second edge of the number of flutes and inset a distance from the outer diameter of the head portion, and wherein each of the number of margin relief surfaces extends from the second end of the generally cylindrical body and terminates at a margin seal within the head portion, and wherein the margin seal is generally spaced a distance from the body relief portion, the distance being at minimum about one half of the outer diameter of the head portion.

2. The rotary cutting tool of claim 1 wherein the number of flutes follow a generally helical path defined by a helix angle relative to the longitudinal axis.

3. The rotary cutting tool of claim 1 wherein the number of flutes are oriented generally parallel to the longitudinal axis.

4. The rotary cutting tool of claim 1 wherein each margin seal comprises a wall portion extending between a corresponding one of the number of margin relief surfaces and the outer diameter of the head portion.

5. The rotary cutting tool of claim 4 wherein the wall portion is oriented generally perpendicular to the longitudinal axis of the cylindrical body.

6. The rotary cutting tool of claim 5 wherein the wall portion is oriented generally perpendicular to the corresponding one of the margin relief surfaces.

7. The rotary cutting tool of claim 5 wherein the wall portion is oriented at an angle relative to the corresponding one of the margin relief surfaces.

8. The rotary cutting tool of claim 5 wherein the wall portion is oriented at an angle relative to the longitudinal axis of the generally cylindrical body.

9. The rotary cutting tool of claim 8 wherein the wall portion is oriented generally perpendicular to the corresponding one of the margin relief surfaces.

10. The rotary cutting tool of claim 8 wherein the wall portion is oriented at an angle relative to the corresponding one of the margin relief surfaces.

11. The rotary cutting tool of claim 1 wherein the generally cylindrical body has a length, and wherein the ratio of the length of the generally cylindrical body to the outer diameter of the head portion is at least 7 to 1.

12. The rotary cutting tool of claim 1 wherein the outer diameter of the head portion varies between a maximum value and a minimum value and wherein the outer diameter of the head portion at or about each margin seal is at or about the maximum value.

13. A method of making a rotary cutting tool having a generally cylindrical body having a first end and an opposite second end, a mounting portion disposed at or near the first end, a head portion disposed at or near the second end, the head portion being structured to engage and cut a workpiece, a body relief portion disposed between the mounting portion and the head portion, the body relief portion having an outer diameter less than the outer diameter of the head portion, the method comprising:
    forming a number of flutes in the generally cylindrical body, the number of flutes extending from the second end of the generally cylindrical body along the head portion and along at least a portion of the body relief portion, each of the number of flutes being generally bounded by a first edge and a second edge;
    forming a number of margin relief surfaces, each margin relief surface being disposed adjacent a first edge and a second edge of the number of flutes and extending from the second end of the cylindrical body and ending at a margin seal formed within the head portion a distance from the body relief portion, the distance being at minimum about one half of the outer diameter of the head portion.

14. The method of claim 13 further comprising simultaneously forming the number of margin relief surfaces and at least a portion of the number of flutes.

15. The method of claim 13 further comprising forming the number of flutes following a generally helical path defined by a helix angle relative to the longitudinal axis of the generally cylindrical body.

16. The method of claim 13 further comprising forming the number of flutes in an orientation generally parallel to the longitudinal axis of the generally cylindrical body.

17. The method of claim 13 further comprising forming at least one of the number of flutes and the number of margin relief surfaces by a grinding operation.

18. The method of claim 13 further comprising forming at least one of the number of flutes and the number of margin relief surfaces by a molding operation.

* * * * *